United States Patent
Spink et al.

(10) Patent No.: US 6,765,718 B1
(45) Date of Patent: Jul. 20, 2004

(54) STEREO SURGICAL MICROSCOPE HAVING AN APPARATUS FOR REFLECTING IN INFORMATION

(75) Inventors: Roger Spink, Berneck (CH); Benno Moser, Berneck (CH); Gunther Wohlgenannt, Zwischenwasser (AT)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 10/110,703

(22) PCT Filed: Oct. 13, 1999

(86) PCT No.: PCT/IB99/01685

§ 371 (c)(1),
(2), (4) Date: Jul. 15, 2002

(87) PCT Pub. No.: WO01/27659

PCT Pub. Date: Apr. 19, 2001

(51) Int. Cl.[7] ............................................. G02B 21/18
(52) U.S. Cl. .......................... 359/372; 359/368; 359/388
(58) Field of Search ................................. 359/368–390; 351/200–247

(56) References Cited

U.S. PATENT DOCUMENTS

| 5,095,887 | A | * | 3/1992 | Leon et al. ................. 600/166 |
| 5,299,053 | A | * | 3/1994 | Kleinburg et al. .......... 359/227 |
| 5,552,929 | A | * | 9/1996 | Fukaya et al. .............. 359/380 |
| 5,557,453 | A | * | 9/1996 | Schalz et al. ............... 359/376 |
| 5,835,264 | A | * | 11/1998 | Tandler et al. .............. 359/377 |
| 5,867,309 | A | * | 2/1999 | Spink et al. ................ 359/377 |
| 6,081,371 | A | * | 6/2000 | Shioda et al. ............... 359/372 |
| 6,088,154 | A | * | 7/2000 | Morita ....................... 359/375 |
| 6,473,229 | B2 | * | 10/2002 | Nakamura .................. 359/377 |
| 6,661,572 | B2 | * | 12/2003 | Spink et al. ................ 359/372 |

FOREIGN PATENT DOCUMENTS

| EP | 712600 | * | 5/1996 | |
| EP | 723175 | * | 7/1996 | |
| JP | 1-319721 | * | 12/1989 | ................ 359/378 |
| WO | 96/36897 | * | 11/1996 | |

* cited by examiner

Primary Examiner—Thong Q Nguyen
(74) Attorney, Agent, or Firm—Hodgson Russ LLP

(57) ABSTRACT

The invention relates to a stereo surgical microscope comprising at least one stop (12, 20) which can interrupt a main beampath in such a way that the user can only see one image when required, wherein the image is received via a reflected-in beam path (21).

6 Claims, 1 Drawing Sheet

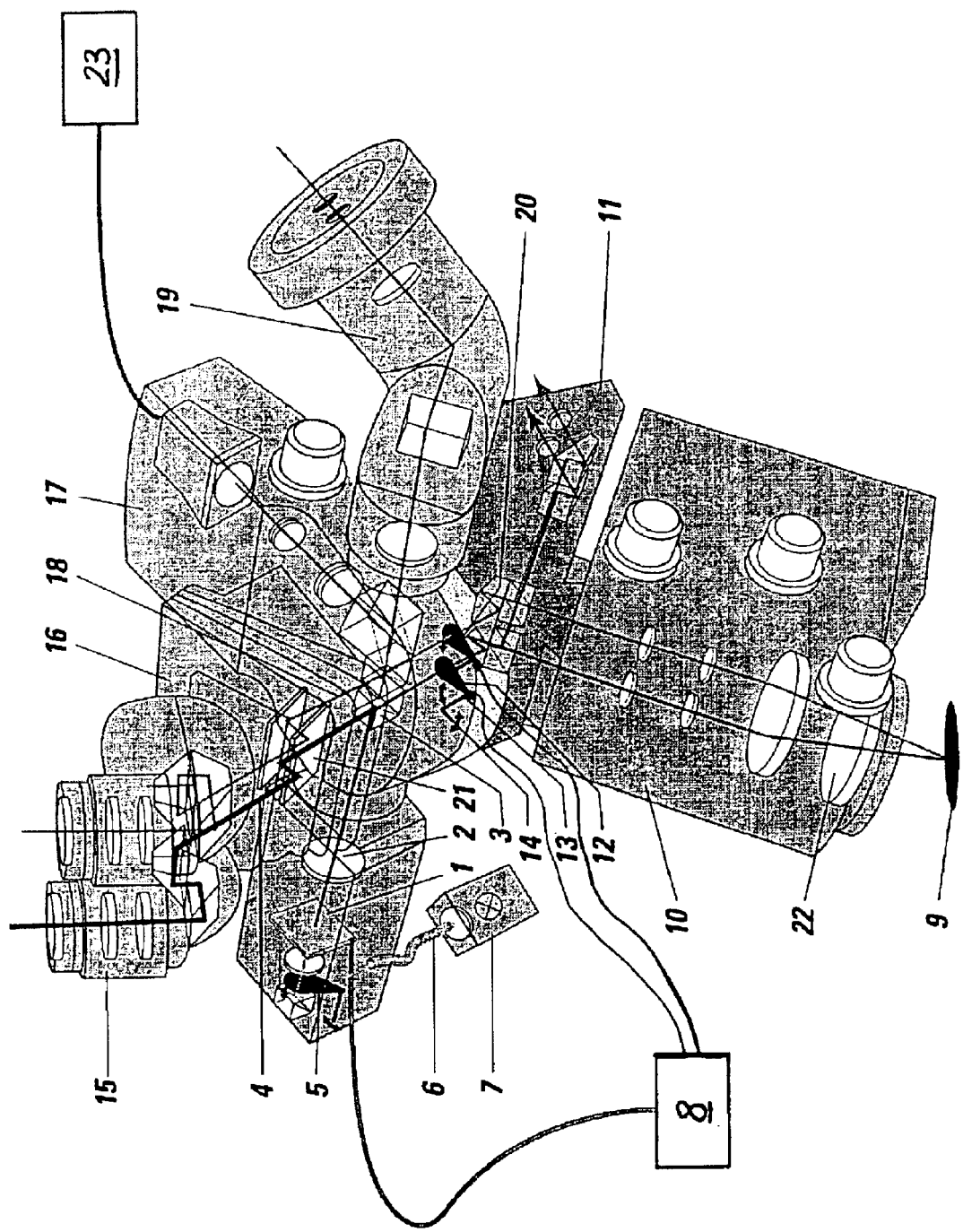

STEREO SURGICAL MICROSCOPE HAVING AN APPARATUS FOR REFLECTING IN INFORMATION

The invention concerns a stereo surgical microscope having an apparatus for reflecting in information.

Surgical microscopes of this kind are being used and more frequently because they give surgeons the ability to receive additional visual information without interrupting his or her visual contact with the surgical field.

Known reflecting-in apparatuses generally comprise a display and an optical system, as well as a beam splitter that overlays the reflected-in image on the main beam path of the surgical microscope.

The purpose of all known reflecting-in apparatuses is to display the reflected-in image to the surgeon simultaneously with the non-reflected-in image from the main beam path. This is important in particular when the intention is to overlay onto the image of the surgical field images that were obtained from other imaging methods (e.g. computer tomograms (CT) or the like). The goal was always that this overlaying needed to be as accurate as possible (overlaid in correlated or positionally correct fashion) and always simultaneous, so that the surgeon could optimally profit from the reflected-in image information. If there was no need for reflection in, no image was reflected in and overlaid. The only exception was constituted by those superimposed images that referred to patient data other than the optical or spatial data of the surgical area (e.g. reflected-in blood-pressure or pulse values).

The invention is based on a consideration different from the concept of single-point overlay whenever possible. In certain situations, a surgeon will prefer to be able to concentrate (at least for a short time) entirely on the overlaid image instead of simultaneously also seeing the image from the main beam path. In practice, such known situations are resolved by the fact that the surgeon looks up from the microscope and looks at a monitor installed next to the microscope, on which the overlaid image is displayed. Alternatively, he or she also looks at a wall-mounted light box on which the CT or X-ray images are mounted.

The inventor has recognized that depending on the situation, this procedure may be disadvantageous:

Firstly, it requires time;

secondly, it forces the surgeon's eyes to perform additional adaptation work (switching from a well-adapted view through the microscope to a distant view with, as a rule, a different adaptation requirement); and thirdly, the view of the monitor or the light box can be blocked at the critical moment by persons in the operating room.

It is thus the object of the invention to find an improvement that eliminates the aforesaid disadvantages and permits a rapid, low-effort view exclusively of the reflected-in image.

This object is achieved by adding a novel stop to interrupt the main beam path while simultaneously keeping open the light path of the reflected-in beam.

The surgeon thus has the capability of switching over, when he or she wishes and without appreciable effort, to the reflected-in image and concentrating on it. In that process, he or she can maintain his or her selected body posture and eye position, and cannot be impeded by persons in the vicinity. Claim 1 recites the invention.

Further improvements and variants, and details of the present invention, are evident from the dependent claims and the description of the drawings and from the drawings, which depict a symbolic exemplary embodiment according to the present invention.

Depending on the requirement, a stop according to the present invention can be provided for each partial stereo beam path, so that both partial beam paths to the surgical field are interrupted; it is also possible, however, for only one stop to be arranged in only one of the two partial beam paths, so that if necessary the surgeon can select, by closing one eye at a time, whether he or she wishes to view exclusively the surgical field or exclusively the reflected-in image. Although he or she thereby loses the stereoscopic view, it is nevertheless particularly fast, since the switchover from one to the other view is made possible by concentrating on the left or right eye (optionally combined with closing the respective other eyelid).

The arrangement of one stop in each partial beam path on the one hand allows complete darkening of the main beam path with no need to close the eyelids asymmetrically; on the other hand, this embodiment also allows two different image data to be reflected in—one for the right and one for the left observation beam path—so that altogether, the surgeon is given the following viewing capabilities:

Stereo viewing of the surgical site with no overlay;

Monocular viewing of the surgical site with the right eye (used less often);

Monocular viewing of the surgical site with the left eye (used less often);

Stereo viewing of the surgical site with stereo overlay of a three-dimensional image (requires a reflected-in beam path and a separate overlay image signal for each main beam path);

Stereo viewing of the surgical site with monocular overlay of a two-dimensional image (requires a reflected-in beam path and a common overlay image signal for each main beam path);

Stereo viewing of the surgical site with monocular overlay of an image reflected in on the right beam path;

Stereo viewing of the surgical site with monocular overlay of an image reflected in on the left beam path;

Monocular viewing of the surgical site by closing one of the two eyes while a reflected-in image is simultaneously overlaid on the particular beam path being viewed (allows the surgeon to take in different image data by alternating closing his or her two eyes, if different overlay images are reflected in on the right and on the left partial stereo beam path);

Stereoscopic viewing of a reflected-in three-dimensional image without overlay (requires a respective reflected-in beam path at both the right and the left beam path);

Monocular viewing of a reflected-in image without overlay in the right or left eyepiece beam path, depending on the reflection conditions;

Alternate monocular viewing by reflecting in different images on the right and left beam paths without overlay (allows the surgeon to look at one or the other image selectably).

The capabilities indicated above can be further added to by appropriate activation of the displays for reflecting in (ability to switch between different images on each display).

A particular development of the invention consists in the coupling thereof to an intelligent, computer-assisted, automatic stop control system. A control system of this kind can, in particular, be programmed so that in the context of specific reflected-in signals, the particular stop necessary, or both stops, in the main beam path are automatically closed. This control system can also perform closing or opening of the first stop in the illuminating beam path.

In this context, the surgeon can preferably program in advance which stop settings are to be made in response to which particular reflected-in signals. In accordance with a further development, however, he or she additionally has the capability for immediate intervention at any time in order to create the stop condition that he or she desires at that moment.

The text above continually refers to a surgeon and to a surgical microscope and a surgical field; the invention is nevertheless not limited thereto, but rather is also available to other users of stereoscopic microscopes. In exceptional cases, the invention in fact is refers to a monocular microscope. What is essential to the invention is the selectable closing off of at least one main beam path in favor of the reflected-in image information. The Claims are to be construed accordingly.

The Parts List is an integral constituent of the disclosure of this Application.

The drawings show a schematic depiction of a surgical stereomicroscope having a display 1 that is imaged into the left main beam path 4 by means of a reflecting-in optical system 2 and beam splitter 3. A user-operable first stop 5 allows display 1 to be blocked out by interrupting an illuminating beam path 6 of a light source 7 behind display 1. In this case, light source 7 is coupled in via an optical light guide.

It is also possible in the context of the invention, however, to use a self-luminous display, in which case first stop 5 is then optionally arranged in front of the display. This stop of itself represents a separate independent invention that yields the following advantages:

The reflecting in of image data, for example by means of an LCD, always requires a high luminance. If, for example, no reflected-in image is then desired, it is always possible to darken the LCD. Even a darkened LCD, however, still allows small amounts of scattered light to pass. Depending on how it is overlaid on the image information in the main beam path, this in some circumstances results in a degradation of contrast in the image of the surgical field. As a result of the additional darkening of the light source using the novel stop 5, according to the present invention the contrast is not impaired.

A curved double arrow indicates the pivotability of first stop 5 about an axis 8. Said shaft 8 is operable in motorized and/or manual fashion, in particular in remotely controlled fashion.

Left main beam path 4 extends from specimen 9 through the left part of microscope optical system 10, and through an adapter 11 for an assistant attachment, which is depicted in this example but is not absolutely necessary for the invention. With the present configuration, however, it would ensure that even when the surgeon interrupts his or her view of the specimen, an assistant still has a complete microscopic view of the specimen.

Arranged after adapter 11 is a second stop 12 according to the present invention with which the beam path to the specimen can be interrupted, according to the present invention, in manual or motor-driven fashion. A pivot axis 13 and an operating lever 14 are indicated.

Following as the beam path proceeds to eyepiece 15 are beam splitter 4 and a pivot apparatus 16 for adapting the angle of inclination of eyepiece 15. This pivot apparatus increases operating convenience but is not essential to the invention.

Also not essential to the invention is a symbolically depicted video camera 17 for acquiring images of specimen 9 through right main beam path 18. The further assistant tube 19 that is depicted is also not essential to the invention. In contrast to adapter 11 for an assistant tube, however, this tube 19 is arranged after a third stop 20 in right main beam path 18, configured comparably to the second stop.

Second and third stops 12 and 20 can be joined to one another so they can be operated synchronously; in the interest of flexibility of the invention as indicated by the capabilities above, however, they can also be equipped for separate operation.

A pivotable stop is in each case depicted in the drawings and described. The invention is not, however, limited to such stops. One skilled in the art will be familiar with a plurality of different stops with which he or she can also achieved the effect desired in accordance with the present invention. These include, for example, slidable stops, LCD optical shutters, iris diaphragms, etc.

Parts List
1 Display
2 Reflecting-in optical system
3 Beam splitter
4 Left main beam path
5 First stop
6 Illuminating optical system with light-guiding cable
7 Light source for display 1
8 Computer for reflecting in and/or correlating images, or control system for converted video image on display 5 [sic]
9 Specimen
10 Microscope optical system
11 Adapter for assistant attachment
12 Second stop
13 Axis for second stop 12
14 Lever for actuation of stop 12
15 Eyepiece optical system
16 Ergonomic tube, pivot apparatus for adjusting inclination of eyepiece tube 15
17 Video camera (module with optical system)
18 Right main beam path
19 Second assistant tube
20 Third stop
21 Reflected-in beam path
22 Main objective
23 Video recording apparatus

What is claimed is:

1. A stereo surgical microscope comprising:
a main objective;
a left main beam path and a right main beam path;
at least one reflected-in beam path and a beam splitter in one of said left and right main beam paths for reflecting in images from said reflected-in beam path that can be overlaid on an image of a specimen;
a display in said at least one reflected-in beam path;
a selectably operable stop arranged between said beam splitter and said main objective for interrupting said one of said left and right main beam paths; and
another selectably operable stop in said at least one reflected-in beam path for controlling the brightness of a viewed image of said display.

2. The microscope as defined in claim 1, wherein said another stop is arranged before said display and there interrupts a beam for illuminating said display.

3. The microscope according to claim 2, wherein said another stop is manually controllable.

4. The microscope according to claim 2, wherein said another stop is remotely controllable in motorized fashion.

5. The microscope as defined in claim 1, further comprising a control system associated with said at least one stop and said another stop for automatically modifying a stop setting by remote control as a function of particular reflected-in signals selected.

6. The microscope as defined in claim 5, wherein the control system grants a user a right of action for arbitrary modification of the automatically performed stop setting.

* * * * *